Patented Sept. 16, 1947

2,427,619

UNITED STATES PATENT OFFICE 2,427,619

PREPARATION OF BARIUM DICYANIMIDE

Daniel E. Nagy and Bryan C. Redmon, Stamford, Conn., assignors to American Cyanamid Company, New York, N. Y., a corporation of Maine No Drawing. Application September 22, 1945, Serial No. 618,072

2 Claims. (Cl. 23—75)

This invention relates to barium dicyanimide and its preparation.

The present invention contemplates that barium dicyanimide may be prepared by the reaction of barium hydroxide with a metal salt of dicyanimide, the metal proportion of which forms an hydroxide whose solubility is less than the aforementioned metal dicyanimide. The general reaction for the formation of barium dicyanimide is given in Equation 1.

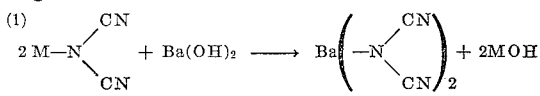

where M is a metal which gives an hydroxide more insoluble than its dicyanimide salt. The preferred metal salts of dicyanimide which undergo the reaction of the present invention are the calcium, copper, and zinc dicyanimides. The example which follows is typical of the method of preparing barium dicyanimide.

Example

Approximately 2 mols of wet zinc dicyanimide is suspended in 500 ml. of water, and this suspension is made alkaline to phenolphthalein by the careful addition of approximately 1.5 mols of barium hydroxide solution. This reaction mixture is thoroughly agitated, and the temperature is kept below substantially 30° C. After about an hour the resultant zinc hydroxide is removed by filtration. The filtrate is neutralized with dilute hydrochloric acid and evaporated under reduced pressure. A substantially quantitative yield of colorless crystalline barium dicyanimide is obtained. This material does not melt or decompose below substantially 315° C. and it is not hygroscopic.

In order to characterize this solid, the optical and crystallographic properties are described. Barium dicyanimide crystallizes in the orthorhombic system in a columnar habit whose form is (001)(100)(010), and it has a positive optic sign. The principal refractive indices as observed in white light are as follows:

$\alpha = 1.463 \pm 0.003$; $\beta = 1.616 \pm 0.003$;

and $\gamma$ is greater than 1.83. The apparent optic axial angle as observed in air is 117°, and the true optic axial angle computed therefrom is 62°. The optic axial plane or principal optic section is the plane (010). The crystals are oriented so that the principal vibration directions are as follows: $\alpha$ is parallel to $c$; $\beta$ is parallel to $b$; $\gamma$ is parallel to $a$, the elongated crystal axis. It is to be understood that the symbols $a$, $b$, and $c$, refer to the crystallographic axes.

Although the above example describes the preparation of barium dicyanimide from zinc dicyanimide, it may also be prepared in a similar manner by precipitating calcium and/or copper hydroxide from the corresponding dicyanimide salt. The insoluble hydroxides are removed prior to the recovery of barium dicyanimide from aqueous solution.

Barium dicyanimide is a valuable chemical intermediate and a source of dicyanimide which is useful in the preparation of pharmaceuticals, chemotherapeutic agents, insecticides, seed disinfectants, plastics, resins, textile agents, and the like. Barium dicyanimide may be used per se as an insecticide.

While the invention has been described with particular reference to specific embodiments, it is to be understood that it is not to be limited thereto but is to be construed broadly and restricted solely by the scope of the appended claims.

What is claimed:

1. A method of preparing barium dicyanimide which includes the steps of reacting a dicyanimide salt of a metal chosen from the group consisting of calcium, copper, and zinc with barium hydroxide to produce a substantially insoluble hydroxide and barium dicyanimide, and removing the aforementioned substantially insoluble hydroxide from the barium dicyanimide.

2. A method of preparing barium dicyanimide which includes the steps of reacting an aqueous slurry containing zinc dicyanimide with barium hydroxide to form substantially insoluble zinc hydroxide and soluble barium dicyanimide, removing the substantially insoluble zinc hydroxide from the aqueous solution containing barium dicyanimide, concentrating the resultant solution to form solid barium dicyanimide, and recovering the barium dicyanimide.

DANIEL E. NAGY.
BRYAN C. REDMON.

REFERENCES CITED

The following references are of record in the file of this patent:

Chemical Abstracts, article by Franklin, vol. 16 (1922), page 1194; also Journal of the American Chemical Society, vol. 44 (1922), pages 486–509.